UNITED STATES PATENT OFFICE.

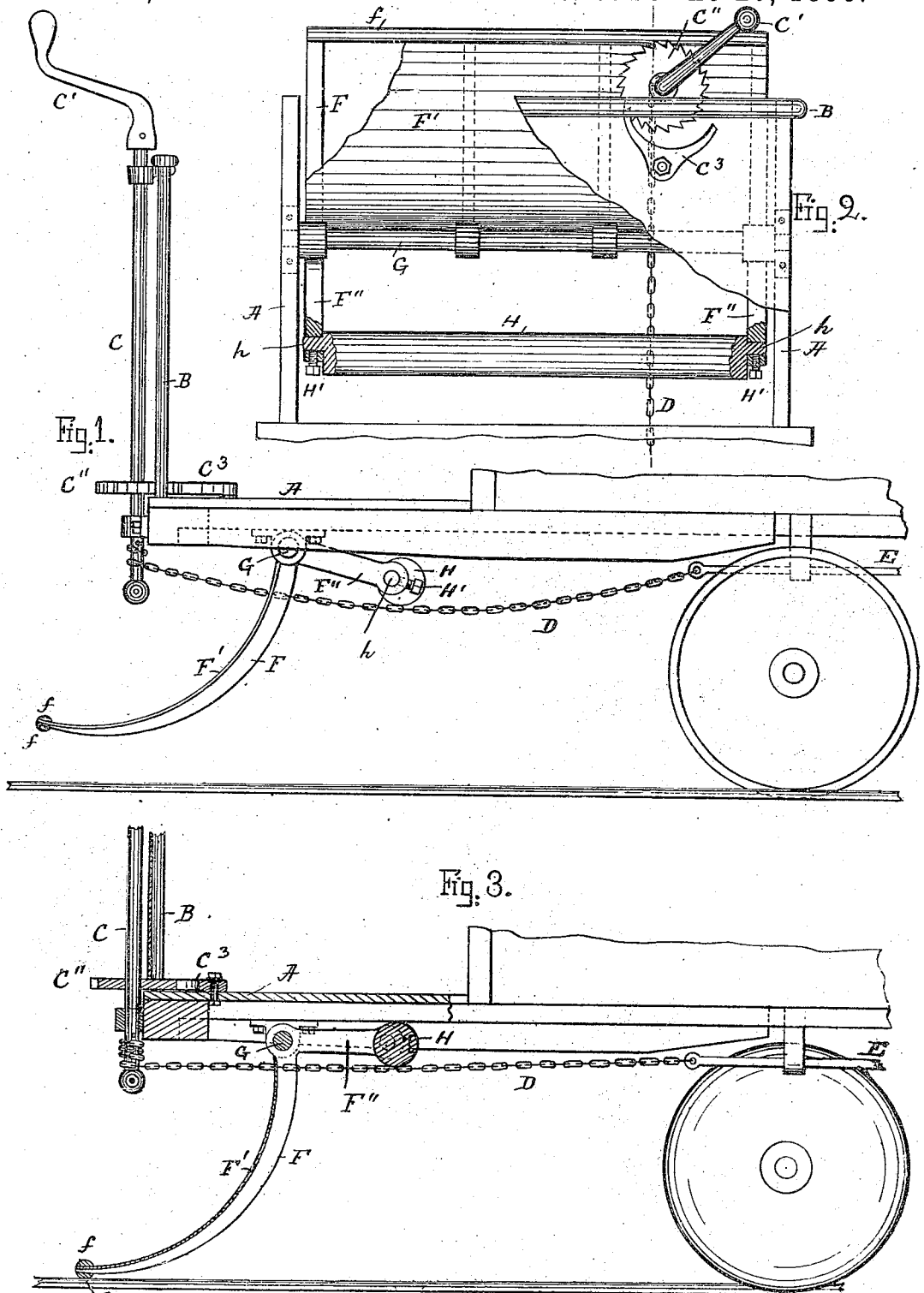

JOSEPH N. WIECZOREK, OF BOSTON, MASSACHUSETTS.

CAR-FENDER.

SPECIFICATION forming part of Letters Patent No. 499,812, dated June 20, 1893.

Application filed December 19, 1892. Serial No. 455,679. (No model.)

*To all whom it may concern:*

Be it known that I, JOSEPH N. WIECZOREK, a citizen of the United States, and a resident of Boston, in the county of Suffolk and State of Massachusetts, have invented new and useful Improvements in Car-Fenders, of which the following, taken in connection with the accompanying drawings, is a specification.

This invention relates to improvements in life saving car fenders for cable, electric or other motor propelled cars and it has for its object to prevent serious injury to persons or animals coming in contact with the car when in motion, and it is carried out as follows, reference being had to the accompanying drawings, wherein—

Figure 1 represents a side elevation showing the fender in its normal raised position. Fig. 2 represents a plan view of the same; and Fig. 3 represents a sectional view showing the fender in its lower working position.

Similar letters refer to similar parts wherever they occur on the different parts of the drawings.

In the drawings A represents the front end of the car frame or platform having a dasher B, a vertical brake shaft C journaled in suitable bearings and provided with a crank or wheel C' as is usual in car brake devices.
C'' is the ratchet wheel on the crank shaft C, and C³ is the locking pawl on the car platform as usual.

To the lower end of the axle C is attached the chain D the rear end of which is secured to the link or rod E, which is connected in a suitable manner to the brake beam, or other intermediate mechanism for forcing the brake shoes against the wheels of a car when the chain is being wound on the axle C in the ordinary manner of operating car brakes.

In the operation of brakes of the aforesaid construction, the chain D sags down as shown in Fig. 1 when the brake is released, and is held taut as shown in Fig. 3, when it is wound upon the axle C during the braking operation.

In connection with the above brake device, I use my improved car fender which is constructed as follows: It consists of a pivoted fender hung in a suitable manner beneath the end of the car, and in practice I prefer to construct such fender of curved or inclined arms F secured in their upper ends to a horizontal shaft G loosely journaled in bearings attached to the car frame or platform as shown in the drawings. To said arms is secured a plate F' preferably made of sheet metal and provided at its lower front end with lateral semi-circular metal ribs *f, f,* for the purpose of imparting strength to said forward end of the fender as well as providing a rounded edge at this place so as to prevent injury to persons or animals coming in contact with it. To the rear of the pivoted arms F, F, are secured, or made in one piece with the same, levers F'', F'', to which is attached in a suitable manner a lateral balance weight or rod H, which is adapted to rest upon the chain D as shown in the drawings. The balance weight H is to be of a size sufficient to slightly more than counter-balance the pivoted fender so as to cause the latter to assume the position shown in Fig. 1, when the brake is released and the chain D slackened thus normally holding the front edge of the fender raised sufficiently above the track to allow it to pass freely by any irregularities in said track or any small obstructions thereon. In case a person should come in front of the moving car either in a standing, falling or reclining position, the first impulse of the motor-man is to set the brake by the turning of the crank C' and by so doing the chain D is made taut causing the counter poise or balance weight H to be raised and the front edge of the fender to be swung downward against the track or pavement, thus preventing the fender from passing over the limbs or body of the person that is struck as well as preventing such person from being run over by the car wheels.

This invention is very simple in its construction and operation particularly as it does not impose additional thought, labor and duties on the part of the motor-man because all that the latter has to do in avoiding impending accidents is to set the brake to stop the car by which the fender is automatically turned upon its axis so as to bring the lower edge of the fender against the track in a manner and for the purpose as stated.

In practice I prefer to use only two levers F'', F'', as supports for the counter weight H which latter is preferably provided with eccentric trunnions *h, h,* journaled in bearings in said arms F″ and provided with set screws H′ for the purpose of securing said weight H in place on the levers F″, F″ after it has been adjusted in its position on said levers. By this arrangement the weight H may be adjusted to the right or left to increase or decrease its position relative to the fulcrum G or it may be adjusted up or down more or less so as to cause the chain as it is being made taut to actuate the pivoted fender more or less quickly relative to the turn of the crank shaft C as may be desired.

Having thus fully described the nature, construction, and operation of my invention, I wish to secure by Letters Patent and claim—

1. A car fender pivoted at its upper end and having a counter weight adapted to hold it in a raised position, combined with a crank axle and chain attached to the latter for the purpose of automatically lowering the fender by the setting of the brake and consequent tightening of the brake chain substantially as specified.

2. A car fender pivoted at its upper end and having a counter weight adapted to rest on and to follow the vertical adjustment of the brake chain, said counter weight having means substantially as described for adjusting its position relative to the car fender and brake chain, as and for the purpose set forth.

In testimony whereof I have signed my name to this specification, in the presence of two subscribing witnesses, on this 8th day of December, A. D. 1892.

JOSEPH N. WIECZOREK.

Witnesses:
ALBAN ANDRÉN,
ALICE A. PERKINS.